United States Patent [19]
Fosmark

[11] Patent Number: 5,991,867
[45] Date of Patent: Nov. 23, 1999

[54] TRANSMIT SCHEDULER FOR AN ASYNCHRONOUS TRANSFER MODE NETWORK AND METHOD OF OPERATION

[75] Inventor: Klaus S. Fosmark, Rockwall, Tex.

[73] Assignee: Efficient Networks, Inc., Dallas, Tex.

[21] Appl. No.: 08/713,211

[22] Filed: Sep. 12, 1996

[51] Int. Cl.[6] .................................................... G06F 9/00
[52] U.S. Cl. .............................. 712/16; 712/18; 712/32; 712/33; 712/39; 712/225; 712/229; 370/230; 370/232; 370/390; 370/395; 370/414; 370/413; 709/230; 709/234
[58] Field of Search ....................... 395/200.76, 200.56, 395/800.16, 800.42; 370/390, 382, 397, 395, 230, 232, 414, 413, 16, 18; 712/32, 33, 39, 225, 229; 709/230, 234

[56] References Cited

U.S. PATENT DOCUMENTS

| | | | |
|---|---|---|---|
| 5,231,631 | 7/1993 | Buhrke et al. | 370/230 |
| 5,274,768 | 12/1993 | Traw et al. | 395/236 |
| 5,280,476 | 1/1994 | Kojima et al. | 370/397 |
| 5,311,509 | 5/1994 | Heddes et al. | 370/397 |
| 5,379,297 | 1/1995 | Glover et al. | 370/234 |
| 5,381,411 | 1/1995 | Ohno et al. | 370/232 |
| 5,414,707 | 5/1995 | Johnston et al. | 370/395 |
| 5,420,858 | 5/1995 | Marshall et al. | 370/352 |
| 5,430,721 | 7/1995 | Dumas et al. | 370/395 |
| 5,455,826 | 10/1995 | Ozveren et al. | 370/232 |
| 5,490,141 | 2/1996 | Lai et al. | 370/352 |
| 5,535,197 | 7/1996 | Cotton | 370/414 |
| 5,548,587 | 8/1996 | Bailey et al. | 370/395 |
| 5,557,607 | 9/1996 | Holden | 370/413 |
| 5,568,486 | 10/1996 | Huscroft et al. | 370/395 |

(List continued on next page.)

FOREIGN PATENT DOCUMENTS

| | | |
|---|---|---|
| 0130260 | 1/1985 | European Pat. Off. . |
| 0325794 | 12/1988 | European Pat. Off. . |
| 9807282 | 4/1998 | WIPO . |

OTHER PUBLICATIONS

"Traffic Management Specification Version 4.0" (af–tm–0056.000), *The ATM Forum Technical Committee*, Apr. 1996, 107 pages.

"Universal Serial Bus Class Definitions for Communication Devices," Version 1.1, *USB Implementers' Forum*, Jan. 19, 1999, 110 pages.

"ATM over ADSL Recommendations," *ADSL Forum Technical Report TR–002*, Mar. 1997, 23 pages.

"Framing and Encapulations Standards for ADSL: Packet Mode," *ADSL Forum WT–004 v3.0 Technical Report*, Mar. 1997, 16 pages.

Daniel Minoli and Michael Vitella, "ATM Cell Relay Service for Corporate Environments," *New York: McGraw–Hill, Inc.*, 1994.

*Primary Examiner*—Meng-Ai T. An
*Assistant Examiner*—Dzung C. Nguyen
*Attorney, Agent, or Firm*—Baker & Botts, L.L.P.

[57] ABSTRACT

A transmit scheduler and method of operation are provided for an asynchronous transfer mode network. The transmit scheduler is operable to write data to and read data from a scheduler table and a virtual channel identifier ("VCI") table in order to schedule cells for virtual channels. The transmit scheduler calculates a location in the scheduler table in which to schedule a cell for a current virtual channel and determines whether a cell for a prior virtual channel is scheduled in the calculated location in the scheduler table. The transmit scheduler then schedules the cell for the current virtual channel at the calculated location in the scheduler table. If a cell for a prior virtual channel was scheduled in the calculated location in the scheduler table, the transmit scheduler writes a pointer into a next pointer field of a record for the current virtual channel in the VCI table, where the pointer provides a link to a record for the prior virtual channel in the VCI table. The transmit scheduler is thereby operable to build linked lists beginning at each location in the scheduler table in which cells for more than one virtual channel are calculated to be scheduled.

14 Claims, 4 Drawing Sheets

U.S. PATENT DOCUMENTS

| | | | |
|---|---|---|---|
| 5,572,522 | 11/1996 | Calamvokis et al. | 370/390 |
| 5,583,861 | 12/1996 | Holden | 370/395 |
| 5,592,476 | 1/1997 | Calamvokis et al. | 370/390 |
| 5,600,650 | 2/1997 | Oskouy | 370/468 |
| 5,602,853 | 2/1997 | Ben-Michael et al. | 370/474 |
| 5,617,416 | 4/1997 | Damien | 370/391 |
| 5,625,625 | 4/1997 | Oskouy et al. | 370/395 |
| 5,629,937 | 5/1997 | Hayter et al. | 370/233 |
| 5,701,292 | 12/1997 | Chiussi et al. | 370/232 |
| 5,726,985 | 3/1998 | Daniel et al. | 370/382 |
| 5,742,765 | 4/1998 | Wong et al. | 709/230 |
| 5,745,477 | 4/1998 | Zeng et al. | 370/230 |
| 5,751,709 | 5/1998 | Rathnavelu | 370/395 |
| 5,852,655 | 12/1998 | McHale et al. | 379/93.14 |

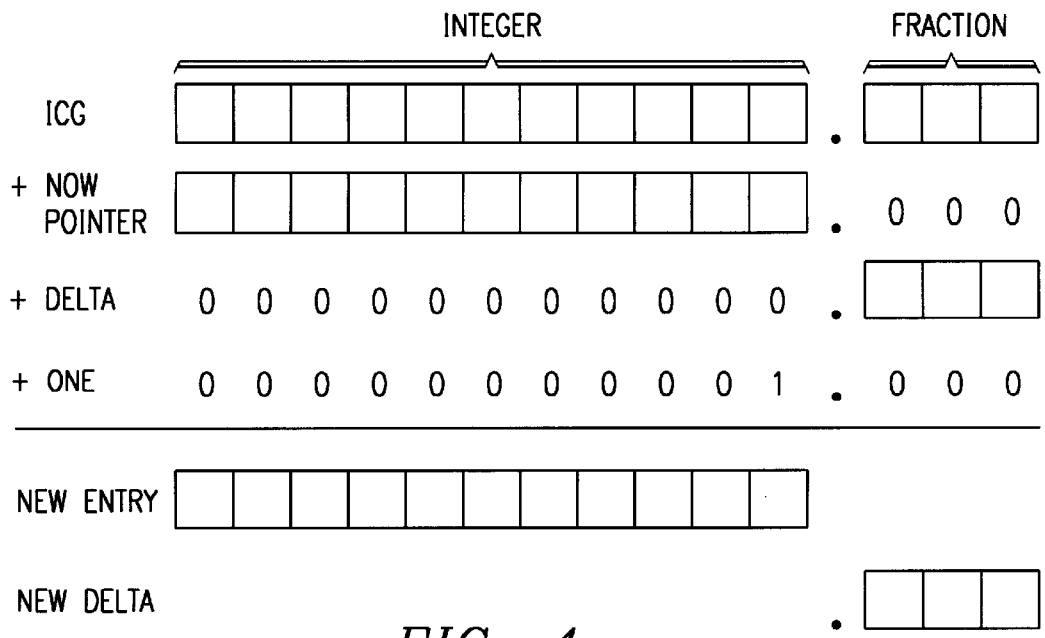
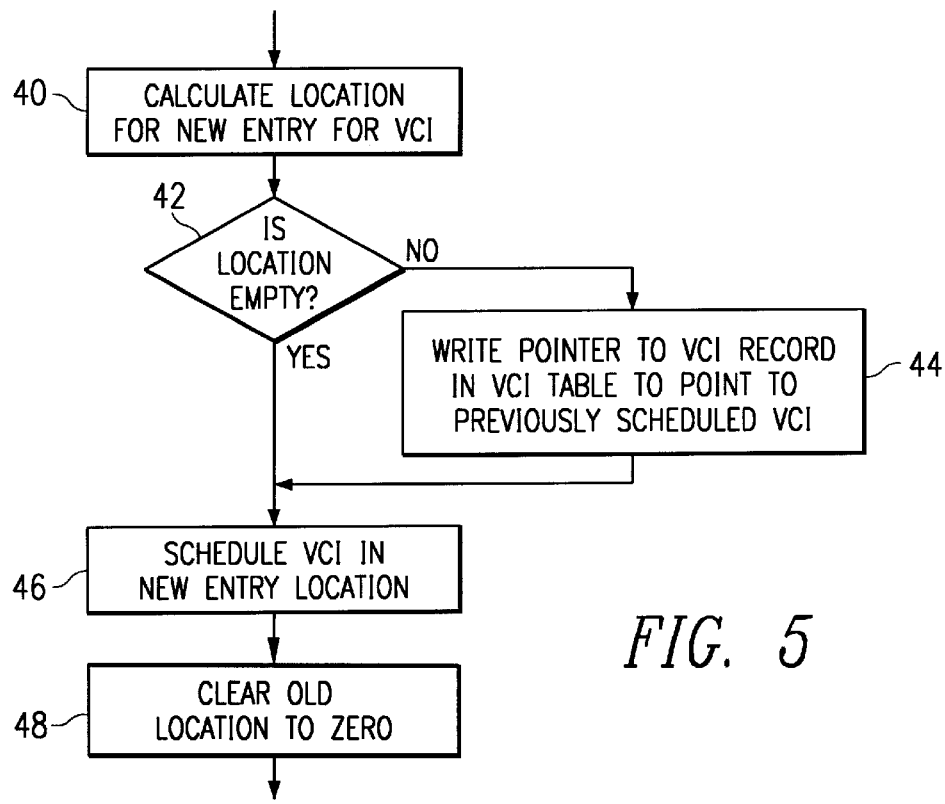
FIG. 4
FIG. 5

TRANSMIT SCHEDULER FOR AN ASYNCHRONOUS TRANSFER MODE NETWORK AND METHOD OF OPERATION

TECHNICAL FIELD OF THE INVENTION

This invention relates in general to the field of electronic systems, and more particularly to a transmit scheduler for an asynchronous transfer mode network and a method of operation.

BACKGROUND OF THE INVENTION

Networks interconnecting end stations increasingly use asynchronous transfer mode (ATM) schemes for transmission of information. In an ATM network, transmitting end stations send information using cells or packets placed in available slots that are then extracted from those slots by the recipient end station. Each end station can include transmission and receiving units for sending and receiving cells on the ATM network. Generally, end stations can be personal computers, computer work stations, or other computer systems that use adapter cards to provide an interface between a native bus on the end station and the ATM network, or otherwise implement adapter functions. End stations can also be devices or systems that provide interworking adapter functions between ATM and other networking technologies such as ATM end stations that bridge to other networks. The adapter functions performed by end stations often establish and manage numerous virtual channels (VC's) that are identified by virtual channel identifiers (VCI's) in order to structure the transmission of cells or packets.

When transmitting cells or packets on an ATM network, a transmission unit of an adapter card or other adapter element can use a scheduler in order to schedule when cells corresponding to the active virtual channels should be sent. The scheduler thereby provides the transmission unit, for example, with information about which cells to retrieve from end station memory for packaging and transmission across the ATM network. Conventional schedulers generally use a fixed and statically-loaded scheduler table to schedule cells for a fixed number of virtual channels. These conventional schedulers advance a single pointer in sequence through the scheduler table in order to determine, for example, which cell for which virtual channel should be packaged and sent.

SUMMARY OF THE INVENTION

In accordance with the present invention, a transmit scheduler for an asynchronous transfer mode network and a method of operation are provided that substantially eliminate or reduce disadvantages and problems associated with conventional asynchronous transfer mode transmit schedulers.

According to one aspect of the present invention, a transmit scheduler and method of operation are provided for an asynchronous transfer mode network. The transmit scheduler is operable to write data to and read data from a scheduler table and a VCI table in order to schedule cells for virtual channels. The transmit scheduler calculates a location in the scheduler table in which to schedule a cell for a current virtual channel and determines whether a cell for a prior virtual channel is scheduled in the calculated location in the scheduler table. The transmit scheduler then schedules the cell for the current virtual channel at the calculated location in the scheduler table. If a cell for a prior virtual channel was scheduled in the calculated location in the scheduler table, the transmit scheduler writes a pointer into a next pointer field of a record for the current virtual channel in the VCI table, where the pointer provides a link to a record for the prior virtual channel in the VCI table. The transmit scheduler is thereby operable to build linked lists beginning at each location in the scheduler table in which cells for more than one virtual channel are calculated to be scheduled.

According to another aspect of the present invention, an adapter for an asynchronous transfer mode network is provided. The adapter includes a memory operable to hold a scheduler table, a VCI table and a FIFO queue. The scheduler table has a plurality of locations for scheduling cells for virtual channels, the VCI table has a record for each of a plurality of active virtual channel, and the FIFO queue has cells for transmission across an asynchronous transfer mode network. A segmenter is coupled to and operable to access the memory and includes the above transmit scheduler in order to schedule cells for virtual channels. The segmenter is operable to retrieve data, build cells based upon the retrieved data and place the cells into the FIFO queue for transmission across the asynchronous transfer mode network.

A technical advantage of the present invention is the ability to define a large number of concurrently transmitting virtual channels, limited only by the available memory. Another technical advantage is the ability to provide controlled behavior when scheduling is overbooked and proportionally scales down rates. A further technical advantage is the ability to control and limit burst size when the scheduler is underbooked.

BRIEF DESCRIPTION OF THE DRAWINGS

A more complete understanding of the present invention and advantages thereof may be acquired by referring to the following description taken in conjunction with the accompanying drawings in which like reference numbers indicate like features, and wherein:

FIG. 4 is chart of one embodiment of a method for calculating a location in a scheduler table at which a cell for a virtual channel should be scheduled according to the teachings of the present invention;

FIG. 5 is a flow chart of one embodiment of a method for scheduling a cell for a virtual channel in a scheduler table according to the teachings of the present invention.

DETAILED DESCRIPTION OF THE INVENTION

Figure 1:
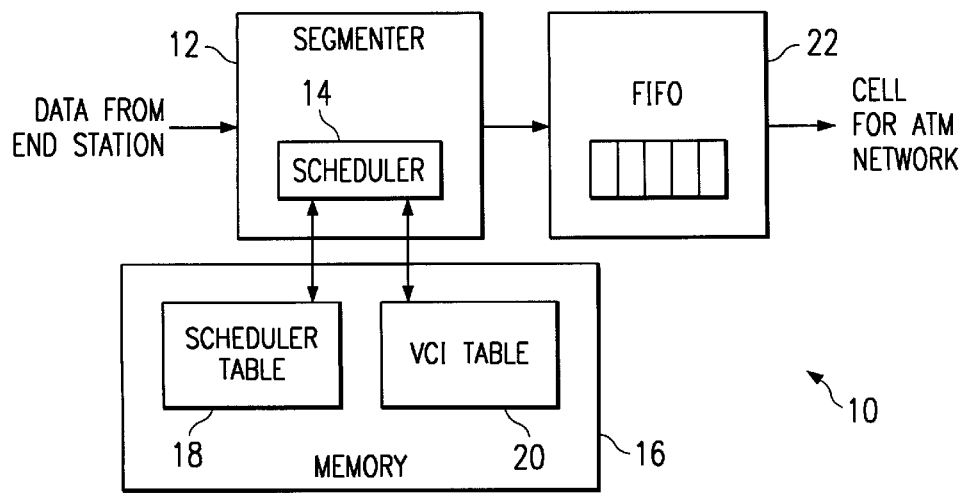
FIG. 1 is a block diagram of one embodiment of an adapter card having a transmit scheduler for an asynchronous transfer mode network constructed according to the teachings of the present invention.

FIG. 1 is a block diagram of one embodiment of an adapter card, indicated generally at 10, having a transmit scheduler for an asynchronous transfer mode (ATM) network constructed according to the teachings of the present invention. It should be understood that adapter card 10 performs functions, other than those relating to cell transmission described herein, that relate to the interconnection between an end station and the ATM network. It should also be understood that the transmit scheduler can be implemented in other systems and devices that perform adapter functions and is not limited to use on an adapter card.

Adapter card 10 includes a segmenter 12 that has a transmit scheduler 14. Segmenter 12 is coupled to a memory 16 that stores a scheduler table 18 and a VCI table 20. A FIFO (first-in-first-out) queue 22 is coupled to segmenter 14 and can also be stored in memory 16. Transmit scheduler 14 can access scheduler table 18 and VCI table 20. As shown, segmenter 12 receives data from an end station and provides cells to FIFO queue 22 which are then provided for transmission on an ATM network. In one implementation, memory 16 is an SRAM memory device and segmenter 12 is implemented as part of an application specific integrated circuit (ASIC) device.

In operation, segmenter 12 retrieves data from the end station that corresponds to a scheduled virtual channel, builds a cell from the data for transmission, and provides the cell to FIFO queue 22. When a slot is available on the ATM network, segmenter 12 places the next cell from FIFO queue 22 onto the ATM network for transmission to a recipient end station.

Transmit scheduler 14 determines for which virtual channel (VC) a cell is scheduled and provides segmenter 12 with that information. Transmit scheduler uses scheduler table 18 and VCI table 20 in the process of scheduling cells for the virtual channels. Scheduler table 18 comprises a plurality of locations in which cells for virtual channels can be scheduled. VCI table 20 stores a record for each active virtual channel, which are differentiated by a virtual channel identifier (VCI). The transmission rate for each virtual channel is also held in the records in VCI table 20, as is a fractional part of the current cell time. Transmit scheduler 14 determines where to schedule cells for each virtual channel and when a virtual channel is next in line to have a cell built and sent across the ATM network.

Figures 2A, 2B:
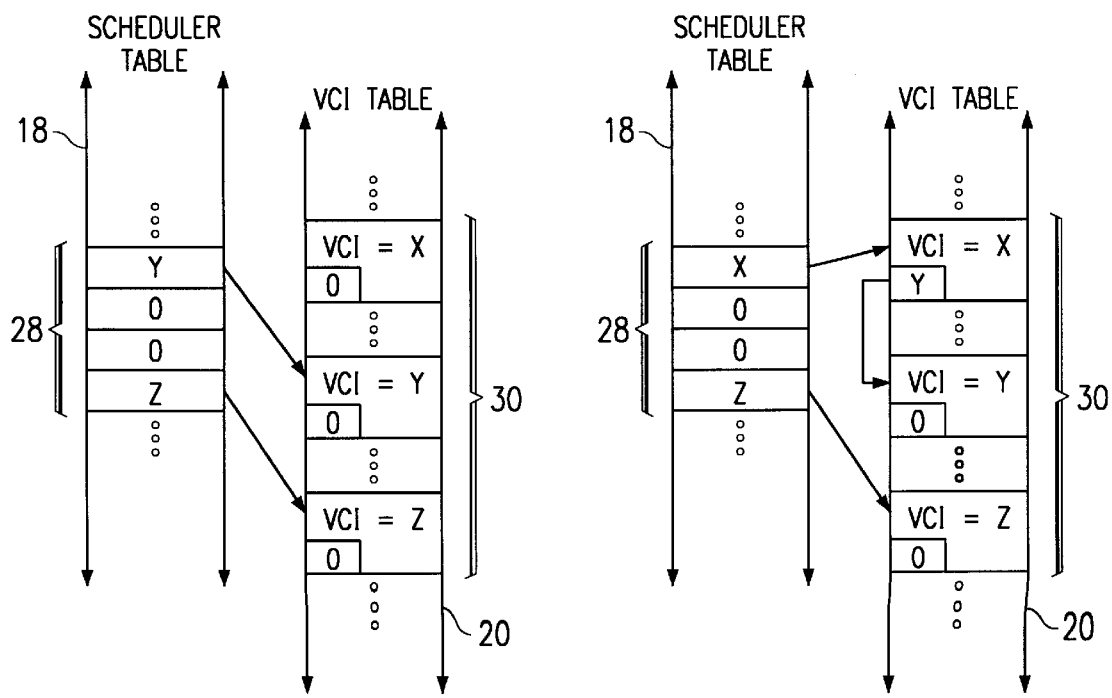
FIGS. 2A and 2B are block diagrams of one embodiment of the use of a scheduler table and a VCI table by a transmit scheduler to schedule a cell for a virtual channel according to the teachings of the present invention.

FIGS. 2A and 2B are block diagrams of one embodiment of the use of scheduler table 18 and VCI table 20 by transmit scheduler 14 to schedule a cell for a virtual channel according to the teachings of the present invention. As shown, scheduler table 18 includes a plurality of locations 28 for scheduling cells for virtual channels. Scheduler table 18 has one cell scheduled for each active virtual channel at any point in time and schedules a new cell for the same active virtual channel when that virtual channel is processed.

In FIG. 2A, for example, cells for a virtual channel having a VCI of "Y" and a virtual channel having a VCI of "Z" are currently scheduled in scheduler table 18. The entries at the scheduled locations point to appropriate records in VCI table 20. As shown, VCI table 20 includes a plurality of records 30 that store information about each active virtual channel. In the illustrated embodiment, VCI table 20 includes records for virtual channels "Y" and "Z" as well as another virtual channel having a VCI of "X." In FIG. 2A, virtual channel "X" is currently unscheduled. In order to schedule a cell for virtual channel "X," transmit scheduler 14 calculates a location for positioning virtual channel "X" within scheduler table 18 and schedules a cell for virtual channel "X" at that location. According to the present invention, if there was a cell for a virtual channel already scheduled at that location, transmit scheduler 14 creates a link to that virtual channel's record in VCI table 20.

FIG. 2B shows the scheduling of a cell for virtual channel "X" by transmit scheduler 14 where the location calculated for virtual channel "X" corresponds with the location in which a cell for virtual channel "Y" is already scheduled. According to the teachings of the present invention, in this situation, a cell for virtual channel "X" is scheduled in the calculated location as shown in FIG. 2B. This location of scheduler table 18 is written with a pointer to the record in VCI table 20 corresponding to virtual channel "X." The pointer to the record for virtual channel "Y," previously held by the location in scheduler table 18, is written to a field, NEXT POINTER, within the record for virtual channel "X." According to the present invention, virtual channel "X" and virtual "Y" are thereby part of a linked list having two elements. The link is created by transmit scheduler 14 by moving the pointer to virtual channel "Y" from scheduler table 18 to the field, NEXT POINTER, within the record for virtual channel "X." By creating a linked list in this manner, the present invention allows controlled behavior when transmit scheduler 14 is overbooked and scales down proportionally each virtual channel in an overbooked situation.

Figure 3A:
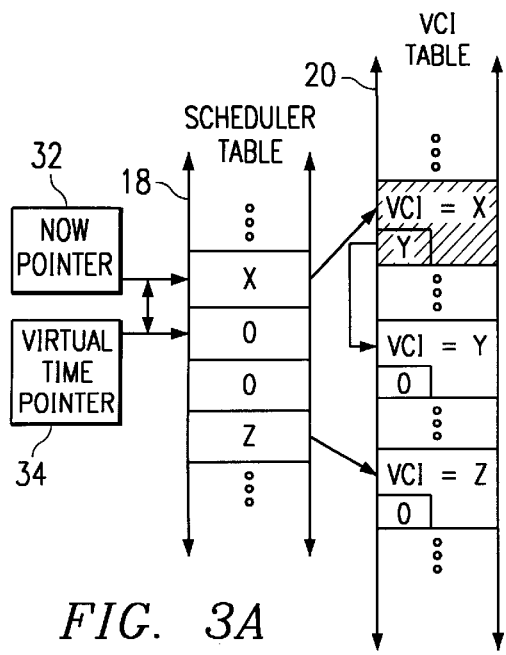
FIGS. 3A, 3B, 3C, and 3D are block diagrams of one embodiment of the use of pointers by a transmit scheduler to determine for which virtual channel a cell should be transmitted according to the teachings of the present invention.
Figure 3B:
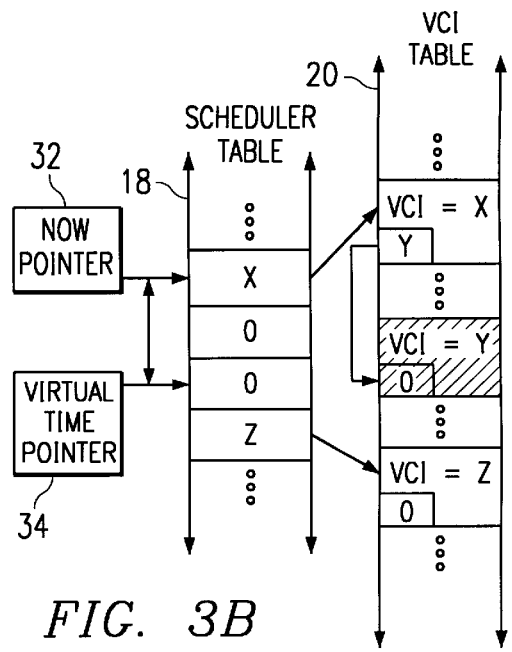
Figure 3C:
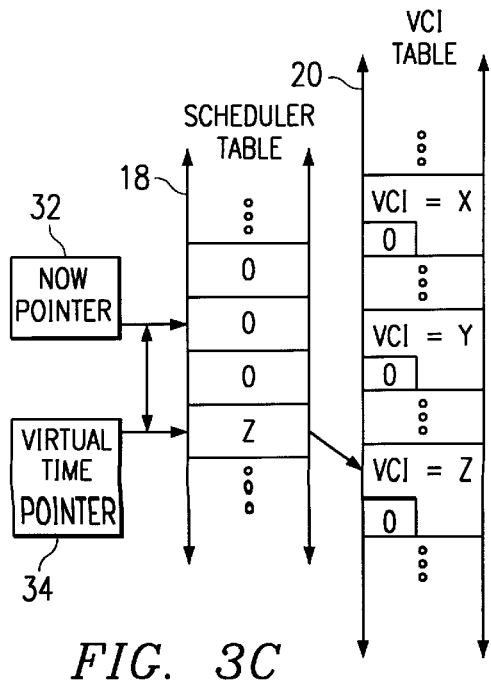
Figure 3D:
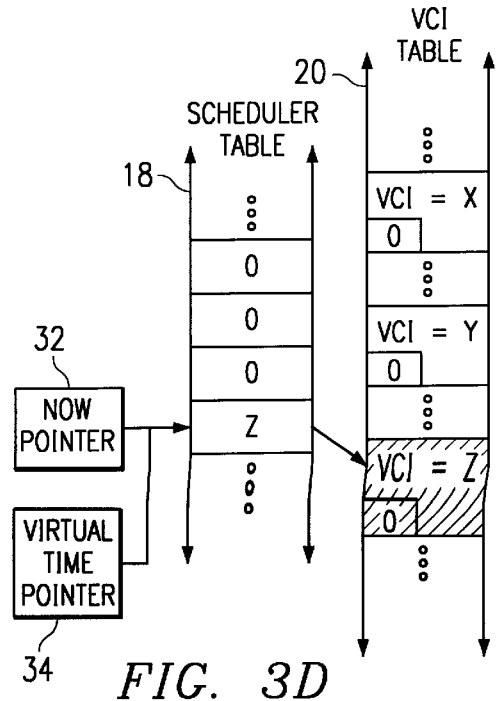

FIGS. 3A, 3B, 3D, and 3D are block diagrams of one embodiment of the use of pointers by transmit scheduler 14 to determine for which virtual channel a cell should be transmitted-according to the teachings of the present invention. As shown in FIG. 3A, scheduler table 18 and VCI table 20 have cells for virtual channel "X," virtual channel "Y," and virtual channel "Z" scheduled. According to the present invention, transmit scheduler 14 maintains a "NOW" pointer 32 and a "VIRTUAL TIME" pointer 34. NOW pointer 32 corresponds to a location for the scheduled virtual channel currently being processed within segmenter 12. VIRTUAL TIME pointer 34 generally represents a location within scheduler table 18 that would correspond to the virtual channel being processed if scheduler table 14 were a simple sequential schedule of cells for virtual channels. In general, VIRTUAL TIME pointer 34 is incremented each time a cell is sent to FIFO queue 22, and NOW pointer 32 is incremented to reach the location of the next scheduled cell for a virtual channel after a location in scheduler table 18 has been exhausted. The management of NOW pointer 32 and VIRTUAL TIME pointer 34 is also described with respect to the flow chart of FIG. 6.

As shown in the example of FIG. 3A, VIRTUAL TIME pointer 34 is one location ahead of NOW pointer 32, and NOW pointer 32 currently points to the location in scheduler table 18 in which a cell for virtual channel "X" is scheduled. Based upon the position of NOW pointer 32, transmit scheduler 14 indicates to segmenter 12 that a cell for virtual channel "X" needs to be built and sent to FIFO queue 22. Segmenter 12 processes virtual channel "X" to retrieve data, to build a cell, and to place the cell in FIFO queue 22.

FIG. 3B shows the situation after the cell for virtual channel "X" has been placed in FIFO queue 22. As shown, VIRTUAL TIME pointer 34 has been incremented one location because a cell was placed in FIFO queue 22. NOW pointer 32 remains pointing to the same location within scheduler table 18 because there is a linked list at that location which has not been exhausted. Transmit scheduler 14 knows that the linked list has not been exhausted because the field, NEXT POINTER, of the record for virtual channel "X" is non-zero. Based upon the position of NOW pointer 32 and the link provided by the NEXT POINTER field, transmit scheduler 14 indicates to segmenter 12 that a cell for virtual channel "Y" needs to be built and sent to FIFO queue 22.

Segmenter 12 processes virtual channel "Y" to retrieve data, to build a cell, and to place the cell in FIFO queue 22.

FIG. 3C shows the situation after the cell for virtual channel "Y" is placed in FIFO queue 22. As shown, VIRTUAL TIME pointer 34 has been incremented one location because a cell was placed in FIFO queue 22. NOW pointer 32 also has been incremented one location because the linked list at the previous location has exhausted. Transmit scheduler 14 knows that the linked list has been exhausted because the NEXT POINTER field of the record for virtual channel "Y" is equal to zero. Based upon the position of NOW pointer 32, transmit scheduler 14 then reads the location in scheduler table 18 to which NOW pointer 32 is pointing. Because that location holds a value of zero, transmit scheduler 14 knows that no cells for virtual channels are scheduled at that location. According to the teachings of the present invention, transmit scheduler 14 continues to increment NOW pointer 32 to pass locations in scheduler table 18 holding a value of zero until NOW pointer 32 reaches the next scheduled location or catches up with VIRTUAL TIME pointer 34. In the example of FIG. 3C, there are two locations that hold a value of zero before the location is reached in which a cell for virtual channel "Z" is scheduled.

FIG. 3D shows the situation after NOW pointer 32 has incremented to point to the location of the next scheduled virtual channel. As shown, NOW pointer 32 has caught up with and is equal to VIRTUAL TIME pointer 34 because it skipped two locations without a cell being placed in FIFO queue 22. In FIG. 3D, NOW pointer 32 points to the location in which a cell for virtual channel "Z" is scheduled. Based upon the position of NOW pointer 32, transmit scheduler 14 indicates to segmenter 12 that a cell for virtual channel "Z" needs to be built and sent to FIFO queue 22. Segmenter 12 processes virtual channel "Z" to retrieve data to build a cell, and to place the cell in FIFO queue 22. After segmenter 12 places a cell for virtual channel "Z" in FIFO queue 22, both NOW pointer 32 and VIRTUAL TIME pointer 34 are incremented. Although not shown, when NOW pointer 32 and VIRTUAL TIME pointer 34 are equal and the current scheduler table 18 has a value of zero, transmit scheduler 14 indicates to segmenter 12 that an idle cell needs to be placed in FIFO queue 22. Transmit scheduler 14 continues processing scheduler table 18 using NOW pointer 32 and VIRTUAL TIME pointer 34 in this manner to determine which virtual channels need to be processed by segmenter 12 to have a cell placed in FIFO queue 22.

FIG. 4 is chart of one embodiment of a method for calculating a location in scheduler table 18 at which a cell for a virtual channel should be scheduled according to the teachings of the present invention. This method uses, as a starting point, the inter-cell gap (ICG) defined for each virtual channel based upon the transmission rate for each virtual channel. As shown, the ICG includes an integer portion and a fraction portion. In the illustrated embodiment, the integer portion of the ICG includes eleven bits, and the fraction portion includes three bits. The value of the NOW pointer is then added to the ICG value. In the illustrated embodiment, the NOW pointer is an eleven bit integer. A delta value for the virtual channel, which can be stored and maintained by transmit scheduler 14 in VCI table 20, is then added to the sum of the ICG value and the NOW pointer value. In the illustrated embodiment, the delta value is a three bit fraction. Lastly, the number one is added to arrive at a result which gives the location for the new entry for and a new delta value for the virtual channel. The new entry location is the eleven bit integer portion of the result, and the new delta value is the three bit fractional portion of the result. The new entry location defines the location within scheduler table 18 in which the cell for the virtual channel will be scheduled. As described above, if that location already has a cell for a virtual channel scheduled in it, a linked list will be created or lengthened by scheduling the cell for the current virtual channel in that location and providing a pointer to the virtual channel previously scheduled at that location.

FIG. 5 is a flow chart of one embodiment of a method for scheduling a cell for a virtual channel in a scheduler table according to the teachings of the present invention. In step 40, a transmit scheduler calculates the location for a new entry for the virtual channel. This calculation can use the method shown and described with respect to FIG. 4, above. After calculating the location for the new entry, in step 42, the transmit scheduler determines whether that location is empty. If the location is not empty, the transmit scheduler, in step 44, writes the pointer currently in that location to the VCI record in the VCI table of the virtual channel being scheduled. This creates or lengthens a linked list and provides a pointer to the previously scheduled virtual channel. Then, after either step 42 or step 44, the transmit scheduler schedules the cell for the current virtual channel in the location for the new entry. After scheduling the cell for the current virtual channel, the transmit scheduler, in step 48, clears the old location in which a cell for that virtual channel was scheduled and sets the value to zero. This process of scheduling cells for virtual channels is repeated for each active virtual channel after a cell for the virtual channel is placed in the FIFO queue.

Figure 6:
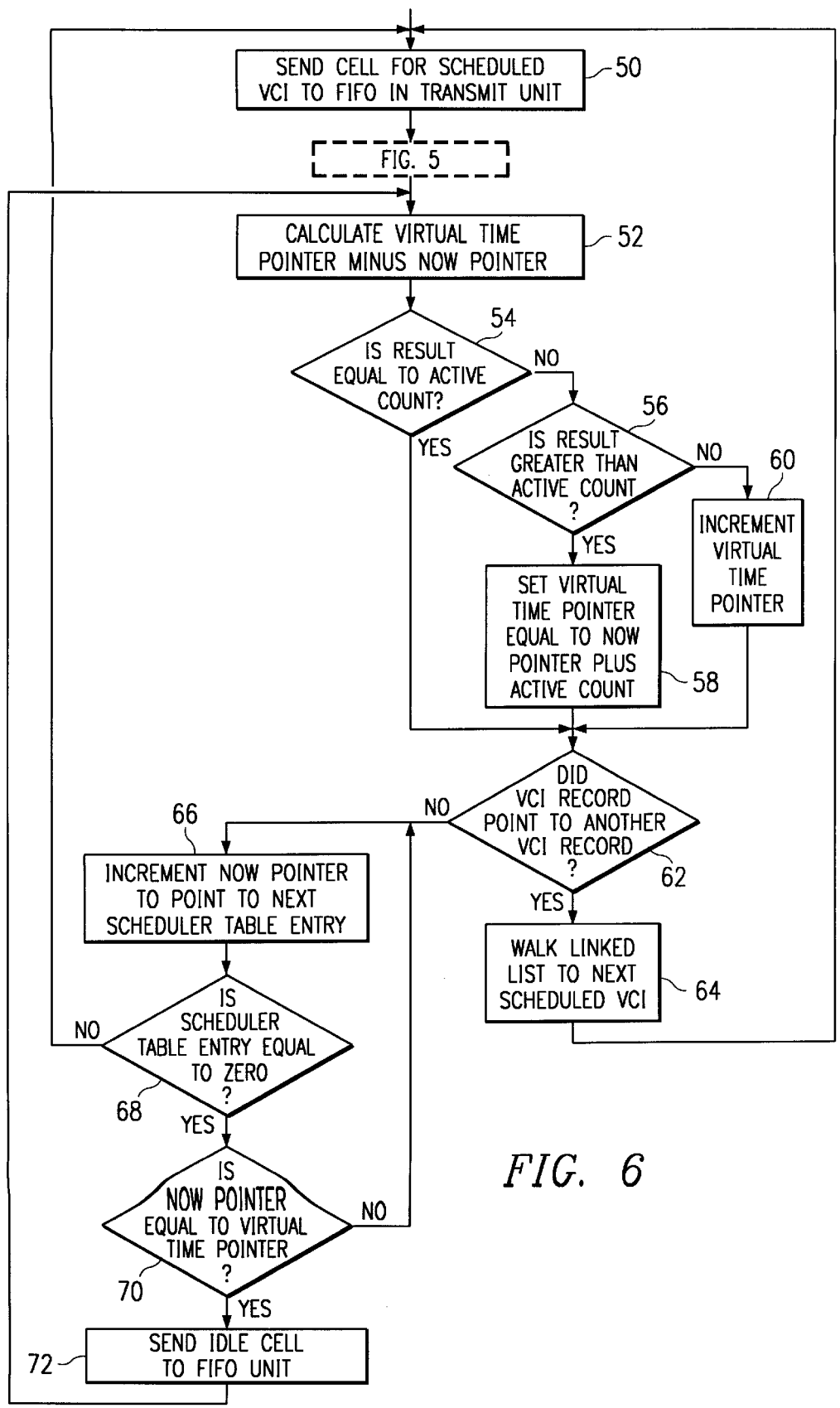
FIG. 6 is a flow chart of one embodiment of a method for managing pointers for a scheduler table according to the teachings of the present invention.

FIG. 6 is a flow chart of one embodiment of a method for managing pointers for a scheduler table according to the teachings of the present invention. In step 50, a transmit scheduler places a cell for a scheduled virtual channel in the FIFO queue. As shown, after step 50, a new cell for the virtual channel is scheduled, for example, according to the method of FIG. 5. Then, in step 52, the transmit scheduler calculates the difference between the VIRTUAL TIME pointer and the NOW pointer. The transmit scheduler then checks, in step 54, whether the result is equal to an "ACTIVE COUNT" which is equal to the number of virtual channels that are currently active. If the result is not equal to the ACTIVE COUNT, then, in step 56, the transmit scheduler determines whether the result is greater than the ACTIVE COUNT. If the result is greater than the ACTIVE COUNT, the transmit scheduler, in step 58, sets the VIRTUAL TIME pointer equal to the NOW pointer plus the ACTIVE COUNT. If the result is not greater than the ACTIVE COUNT, the transmit scheduler, in step 60, increments the VIRTUAL TIME pointer. After steps 54 through 60, the transmit scheduler will have set the VIRTUAL TIME pointer.

In step 62, the transmit scheduler checks whether the record in the VCI table for the virtual channel for which a cell was sent in step 50 includes a pointer to another virtual channel record. If so, in step 64, the transmit scheduler traverses the linked list to the next scheduled virtual channel. The transmit scheduler then returns to step 50, sends a cell for that scheduled virtual channel to the FIFO queue, and repeats the steps as shown. If the record did not point to another virtual channel record, then, in step 66, the transmit scheduler increments the NOW pointer to point to the next scheduler table entry. After incrementing the NOW pointer, the transmit scheduler, in step 68, determines whether the scheduler table location pointed to by the NOW pointer holds a value equal to zero. If not, the transmit scheduler returns to step 50 and sends a cell for the scheduled virtual channel to the FIFO queue. If the scheduler table entry does hold a value equal to zero, then, in step 70, the transmit scheduler determines whether the NOW pointer is equal to the VIRTUAL TIME pointer. If so, the transmit scheduler, in step 82, tells the segmenter to send an idle cell to the FIFO queue and returns to step 52. If, in step 80, the NOW pointer is not equal to the VIRTUAL TIME pointer, then the transmit scheduler returns to step 66 and increments the NOW pointer to point to the next scheduler table location. This allows the NOW pointer to advance over zero entries in the scheduler table in order to move closer to the VIRTUAL TIME pointer where the NOW pointer is behind the VIRTUAL TIME pointer.

The method shown in FIG. 6 provides management of the NOW pointer and the VIRTUAL TIME pointer such that the VIRTUAL TIME pointer does not get further ahead than ACTIVE COUNT from the NOW pointer. In addition, the NOW pointer, when behind, is advanced ahead over zero entries in the scheduler table in order to catch up to the VIRTUAL TIME pointer. The limiting of the VIRTUAL TIME pointer to be no more than a defined count ahead of the NOW pointer provides a controlled and limited burst size in the situation where only a few virtual channels are active and the transmit scheduler comes out of overbooking. The building of a linked list when scheduling cells for virtual channels in the manner described above allows the present invention to schedule cells for a number of virtual channels limited only by the available memory space. It also allows a scaled reduction in rates for the active virtual channels when the transmit scheduler is overbooked.

In general, the NOW pointer is advanced whenever the NOW pointer is different from the VIRTUAL TIME pointer and there is room in the FIFO queue for additional cells. The segmenter writes an idle cell to the FIFO queue if the scheduler table location pointed to by the NOW pointer is zero, and the NOW pointer is equal to the VIRTUAL TIME pointer. Otherwise, the transmit scheduler is behind the VIRTUAL TIME pointer and attempts to catch up by skipping zero entries. After sending out a cell for a virtual channel, the next location for the virtual channel in the scheduler table can be calculated, a cell for the virtual channel can be scheduled at the new location, and the old location can be cleared to zero. In general, the VIRTUAL TIME pointer is incremented whenever a cell is placed into the FIFO queue, but only if the difference between the VIRTUAL TIME pointer and the NOW pointer is less than the ACTIVE COUNT. The ACTIVE COUNT us incremented whenever a new virtual channel is added to the transmit scheduler and decremented whenever a virtual channel goes idle. If the ACTIVE COUNT is decremented, because a virtual channel is removed, and the VIRTUAL TIME pointer is more than the new ACTIVE COUNT ahead of the NOW pointer, then the VIRTUAL TIME pointer can be set to equal the sum of the NOW pointer and the current ACTIVE COUNT. When rescheduling a cell for a virtual channel for transmission at a location where a cell for a virtual channel is already scheduled, the field, NEXT POINTER, in the VCI table for the new virtual channel is set to point to the previously scheduled virtual channel, and the scheduler table entry is then set to point to the current virtual channel.

Although the present invention has been described in detail, it should be understood that various changes, substitutions and alterations can be made hereto without departing from the spirit and scope of the invention as defined by the appended claims.

What is claimed is:

1. A transmit scheduler for an asynchronous transfer mode network:
    the transmit scheduler operable to write data to and read data from a scheduler table and a virtual channel identifier (VCI) table in order to schedule cells for virtual channels by:
        using a first pointer and a second pointer to maintain position within the scheduler table, the first pointer indicating a current location and the second pointer indicating a virtual location;
        determining from the scheduler table which virtual channel is currently scheduled for processing by a segmenter;
        calculating a location in the scheduler table in which to schedule a cell for the current virtual channel;
        determining whether a cell for a prior virtual channel is scheduled in the calculated location in the scheduler table;
        scheduling the cell for the current virtual channel at the calculated location in the scheduler table; and
        writing a pointer into a next pointer field of a record for the current virtual channel in the VCI table if a cell for a prior virtual channel was scheduled in the calculated location in the scheduler table, the pointer providing a link to a record for the prior virtual channel in the VCI table;
        such that the transmit scheduler is operable to build linked lists beginning at each location in the scheduler table in which cells for more than one virtual channel are calculated to be scheduled.

2. The transmit scheduler of claim 1, wherein the transmit scheduler increments the second pointer when a cell is placed into a FIFO queue by the segmenter.

3. The transmit scheduler of claim 1, wherein the transmit scheduler increments the second pointer when a cell is placed into a FIFO queue by the segmenter, but does not increment the second pointer when a cell is placed into the FIFO queue if the second pointer is more than a defined distance ahead of the first pointer.

4. The transmit scheduler of claim 1, wherein the transmit scheduler increments the second pointer when a cell is placed into a FIFO queue by the segmenter and increments the first pointer to skip locations holding a value of zero until a location holding a scheduled virtual channel is reached in order to catch the second pointer when the second pointer is ahead.

5. An adapter for an asynchronous transfer mode network, comprising:
    a memory operable to hold a scheduler table, a virtual channel identifier (VCI) table, and a FIFO queue, the scheduler table having a plurality of locations for scheduling cells for virtual channels, the VCI table having a record for each of a plurality of active virtual channels, and the FIFO queue having cells for transmission across an asynchronous transfer mode network; and
    a segmenter coupled to and operable to access the memory, the segmenter further operable to retrieve data, build cells based upon the retrieved data, and place the cells into the FIFO queue for transmission across the asynchronous transfer mode network; and
    the segmenter comprising a transmit scheduler operable to write data to and read data from the scheduler table and the VCI table in order to schedule cells for virtual channels by:
        using a first pointer and a second pointer to maintain position within the scheduler table, the first pointer indicating a current location and the second pointer indicating a virtual location;

determining from the scheduler table which virtual channel is currently scheduled for processing by the segmenter;

calculating a location in the scheduler table in which to schedule a cell for the current virtual channel;

determining whether a cell for a prior virtual channel is scheduled in the calculated location in the scheduler table;

scheduling the cell for the current virtual channel at the calculated location in the scheduler table; and writing a pointer into a next pointer field of a record for the current virtual channel in the VCI table if a cell for a prior virtual channel was scheduled in the calculated location in the scheduler table, the pointer providing a link to a record for the prior virtual channel in the VCI table;

such that the transmit scheduler is operable to build linked lists beginning at each location in the scheduler table in which cells for more than one virtual channel are calculated to be scheduled.

6. The adapter card of claim 5, wherein the transmit scheduler increments the second pointer when a cell is placed into the FIFO queue by the segmenter.

7. The adapter card of claim 5, wherein the transmit scheduler increments the second pointer when a cell is placed into the FIFO queue by the segmenter, but does not increment the second pointer when a cell is placed into the FIFO queue if the second pointer is more than a defined distance ahead of the first pointer.

8. The adapter card of claim 5, wherein the transmit scheduler increments the second pointer when a cell is placed into the FIFO queue by the segmenter and increments the first pointer to skip locations holding a value of zero until a location holding a scheduled virtual channel is reached in order to catch the second pointer when the second pointer is ahead.

9. The adapter card of claim 5, wherein the segmenter is implemented on an application specific integrated circuit, and the memory is a static random access memory device.

10. A method of operation for a transmit scheduler for an asynchronous transfer mode network, comprising:

using a first pointer and a second pointer to maintain position within a scheduler table, the first pointer indicating a current location and the second pointer indicating a virtual location;

determining a virtual channel currently scheduled for processing from the scheduler table;

calculating a location in a scheduler table in which to schedule a cell for the current virtual channel;

determining whether a cell for a prior virtual channel is scheduled in the calculated location in the scheduler table;

scheduling the cell for the current virtual channel at the calculated location in the scheduler table; and writing a pointer into a next pointer field of a record for the current virtual channel in a virtual channel identifier (VCI) table if a cell for a prior virtual channel was scheduled in the calculated location in the scheduler table, the pointer providing a link to a record for the prior virtual channel in the VCI table;

such that linked lists are built beginning at each location in the scheduler table in which cells for more than one virtual channel are calculated to be scheduled.

11. The method of claim 10, wherein using a first pointer and a second pointer to maintain position comprises incrementing the second pointer when a cell is placed into a FIFO queue for transmission across the asynchronous transfer mode network.

12. The method of claim 10, wherein using a first pointer and a second pointer to maintain position comprises incrementing the second pointer when a cell is placed into a FIFO queue for transmission across the asynchronous transfer mode network, but not incrementing the second pointer when a cell is placed into the FIFO queue if the second pointer is more than a defined distance ahead of the first pointer.

13. The method of claim 10, wherein using a first pointer and a second pointer to maintain position comprises incrementing the second pointer when a cell is placed into a FIFO queue for transmission across the asynchronous transfer mode network and incrementing the first pointer to skip locations holding a value of zero until a location holding a scheduled virtual channel is reached in order to catch the second pointer when the second pointer is ahead.

14. The method of claim 10, wherein the method is implemented by an application specific integrated circuit.

* * * * *